United States Patent
Gubrinski et al.

(10) Patent No.: US 12,076,690 B2
(45) Date of Patent: *Sep. 3, 2024

(54) PROCESS AND PLANT FOR PURIFYING CRUDE SYNTHESIS GAS

(71) Applicant: L'Air Liquide, Société Anonyme pour l'Etude et l'Exploitation des Procédés Georges Claude, Paris (FR)

(72) Inventors: Alfred Gubrinski, Frankfurt am Main (DE); Sharon Corbet, Frankfurt (DE); Dorit Rappold, Frankfurt (DE); Pankaj Puri, Crakow (PL)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 804 days.

This patent is subject to a terminal disclaimer.

(21) Appl. No.: 17/253,358

(22) PCT Filed: May 29, 2019

(86) PCT No.: PCT/EP2019/025159
§ 371 (c)(1),
(2) Date: Dec. 17, 2020

(87) PCT Pub. No.: WO2019/242883
PCT Pub. Date: Dec. 26, 2019

(65) Prior Publication Data
US 2021/0260521 A1    Aug. 26, 2021

(30) Foreign Application Priority Data
Jun. 18, 2018  (EP) .................................... 18400026

(51) Int. Cl.
*B01D 53/02*    (2006.01)
*B01D 53/14*    (2006.01)
(Continued)

(52) U.S. Cl.
CPC ..... *B01D 53/1462* (2013.01); *B01D 53/1406* (2013.01); *B01D 53/1425* (2013.01);
(Continued)

(58) Field of Classification Search
CPC .... B01D 2252/2021; B01D 2252/2026; B01D 2252/20426; B01D 2252/20431;
(Continued)

(56) References Cited

U.S. PATENT DOCUMENTS 4,345,918 A * 8/1982 Meissner ........... B01D 53/1425
95/183
4,430,316 A 2/1984 Ranke et al.
(Continued)

FOREIGN PATENT DOCUMENTS

| DE | 10 2008 057937 | 5/2010 |
|---|---|---|
| DE | 10 2012 023333 | 6/2014 |
| EP | 1 022 046 | 7/2000 |

OTHER PUBLICATIONS

Ullmann's Encyclopedia of Industrial Chemistry, Physical absorption processes, 6th ed. vol. 15, 399-407.
(Continued)

*Primary Examiner* — Christopher P Jones
(74) *Attorney, Agent, or Firm* — Elwood L. Haynes

(57) ABSTRACT

The invention relates to a process for removal of unwanted, in particular acidic gas constituents, for example carbon dioxide and hydrogen sulfide, from a crude synthesis gas by gas scrubbing with a scrubbing medium. According to the invention the flash gases obtained during the decompression of the laden scrubbing medium are supplied to a recompressor in order to recycle these to the crude synthesis gas and thus utilize them materially after the recompression. Alternatively or in addition the flash gases may also be supplied to a decompression turbine to recover refrigeration and
(Continued)

mechanical work. If the recompressor and/or the decompression turbine are/is designed to have multiple stages, the flash gases obtained at different pressure levels are preferably supplied to a corresponding pressure level of the recompressor and/or of the decompression turbine.

6 Claims, 2 Drawing Sheets

(51) Int. Cl.
    *B01D 53/18*     (2006.01)
    *C10K 1/00*     (2006.01)
    *C10K 1/14*     (2006.01)

(52) U.S. Cl.
    CPC ..... *B01D 53/1468* (2013.01); *B01D 53/1475* (2013.01); *B01D 53/18* (2013.01); *C10K 1/004* (2013.01); *C10K 1/005* (2013.01); *C10K 1/006* (2013.01); *C10K 1/14* (2013.01); *B01D 2252/2021* (2013.01); *B01D 2256/16* (2013.01); *B01D 2256/20* (2013.01); *B01D 2257/304* (2013.01); *B01D 2257/306* (2013.01); *B01D 2257/406* (2013.01); *B01D 2257/408* (2013.01); *B01D 2257/504* (2013.01); *B01D 2257/7027* (2013.01)

(58) Field of Classification Search
    CPC ........... B01D 2252/20468; B01D 2252/20489; B01D 2256/16; B01D 2256/20; B01D 2257/304; B01D 2257/306; B01D 2257/406; B01D 2257/408; B01D 2257/504; B01D 2257/7027; B01D 53/1406; B01D 53/1425; B01D 53/1462; B01D 53/1468; B01D 53/1475; B01D 53/18; C01B 3/52; C10K 1/004; C10K 1/005; C10K 1/006; C10K 1/08; C10K 1/14; Y02P 20/129

See application file for complete search history.

(56) References Cited

U.S. PATENT DOCUMENTS

| | | | |
|---|---|---|---|
| 5,067,972 A | 11/1991 | Hemmings et al. | |
| 6,342,091 B1 | 1/2002 | Menzel et al. | |
| 11,555,158 B2* | 1/2023 | Gubrinski | C01B 32/50 |
| 2007/0129450 A1* | 6/2007 | Barnicki | C10G 2/30 |
| | | | 518/703 |
| 2010/0319254 A1 | 12/2010 | Thacker | |
| 2013/0017144 A1* | 1/2013 | Menzel | C01B 17/0408 |
| | | | 422/187 |
| 2013/0327990 A1* | 12/2013 | Mak | B01D 53/1406 |
| | | | 422/162 |
| 2015/0298026 A1* | 10/2015 | Radzicki | B01D 19/0005 |
| | | | 95/264 |
| 2020/0407221 A1* | 12/2020 | Gubrinski | B01D 53/1425 |

OTHER PUBLICATIONS

International Search Report and Written Opinion for corresponding PCT/EP2019/025159, Dec. 9, 2019.

* cited by examiner

PROCESS AND PLANT FOR PURIFYING CRUDE SYNTHESIS GAS

CROSS REFERENCE TO RELATED APPLICATIONS

This application is a 371 of International Application No. PCT/EP2019/025159, filed May 29, 2019, which claims priority to European Patent Application No. 18400026.3, filed Jun. 18, 2018, the entire contents of which are incorporated herein by reference.

BACKGROUND

Field of the Invention

The invention relates to a process for removal of unwanted, in particular acidic gas constituents, for example carbon dioxide and hydrogen sulfide, from crude synthesis gas by gas scrubbing with a scrubbing medium. The invention further relates to a plant for performing such a process.

Prior Art

Processes for separation of undesired concomitants from industrial crude gases by physical or chemical absorption or gas scrubbing are well-known from the prior art. Thus such processes may be used to safely remove down to trace amounts unwanted, acidic constituents of crude synthesis gases produced by gasification or reforming of carbon-containing inputs, for example carbon dioxide ($CO_2$) and hydrogen sulfide ($H_2S$) but also further constituents such as carbonyl sulfide (COS) and hydrogen cyanide (HCN), from the wanted synthesis gas constituents hydrogen ($H_2$) and carbon monoxide (CO). A known and often employed process is the Rectisol process which is described in principle in Ullmann's Encyclopedia of Industrial Chemistry, 6th Ed. Vol. 15, p 399 et seq. In the Rectisol process the abovementioned unwanted disruptive components are absorbed by cold methanol, i.e. methanol cooled significantly below ambient temperature, as an absorbent or scrubbing medium, wherein intensive mass transfer between the crude gas and the absorption medium/scrubbing medium takes place in an absorber column also known as a scrubbing column. The solubility of the unwanted gas constituents increases drastically with decreasing temperature of the methanol and increasing pressure while remaining practically constant for hydrogen and carbon monoxide. Methanol additionally has the advantage of retaining a low viscosity and thus good mass and heat transfer properties even at temperatures down to −75° C.

The methanol laden with the disruptive components and used as scrubbing medium is circulated through regeneration apparatuses in the Rectisol process. In the regeneration apparatuses the laden methanol is freed from the absorbed gases by physical means. Thus in a first regeneration step $CO_2$ is removed from the laden methanol scrubbing medium by decompression (so-called flash regeneration) and/or stripping with a gas, for example nitrogen. In a further or alternative regeneration step the sulfur-containing gases, COS and $H_2S$, are driven off by heating (so-called hot regeneration). It is often sought to produce a virtually $CO_2$-free COS/$H_2S$ gas since economic further processing thereof is impaired by mixing with $CO_2$.

In the Rectisol process a distinction is made between the standard process and the selective Rectisol process. In the standard Rectisol process the concomitant gases COS/$H_2S$ and the $CO_2$ are removed from the crude synthesis gas together in one absorption step. By contrast, in the so-called selective Rectisol process the sulfur-containing concomitant gases COS/$H_2S$ and the $CO_2$ are respectively removed from the crude synthesis gas in separate consecutive absorption steps. This selective absorption is achieved by suitable adjustment of the process parameters, in particular the quantity ratio of scrubbing medium and gas to be absorbed. The advantage of selective absorption is that the COS/$H_2S$ and the $CO_2$ gas are already kept very largely separate in the absorption and only the smaller portion requires separation during the regeneration of the methanol. This also allows for recovery of the sulfur present using downstream processes such as for example the Claus process.

Flash regeneration of the scrubbing medium laden with acidic gas constituents may be carried out in a multi-stage procedure, wherein mechanical work and refrigeration can be recovered in the decompression. Thus, in a process for removal of acidic constituents such as $CO_2$, $H_2S$ and COS from a gas stream U.S. Pat. No. 5,067,972 proposes treating said stream with a physical scrubbing medium. The scrubbing medium laden with the acidic gas constituents is supplied to a cascade of flash vessels of incrementally decreasing pressure and the flash gases thus liberated are supplied between two stages of a multi-stage decompression turbine in each case. This recovers mechanical work and process refrigeration. However, the flash gas obtained at the end of the decompression cascade is used merely as coolant for the crude gas introduced into the process and is then discharged from the process. One disadvantage of this is that no further utilization, for example utilization as material, of the flash gases obtained is taught.

SUMMARY

The problem addressed by the invention is accordingly that of specifying a process which avoids the recited disadvantages of the processes known from the prior art and in which in particular the flash gases obtained are also utilized materially.

This problem is solved substantially by a process having the features of Claim 1. Further embodiments, in particular preferred embodiments, of the process according to the invention may be found in the dependent claims. The invention further relates to a plant for performing such a process.

Process According to the Invention

Process for purifying a crude synthesis gas by gas scrubbing with a scrubbing medium comprising the steps of:
(a) providing and supplying the crude synthesis gas to a prescrubber for removal of trace components such as $NH_3$, HCN, mercaptans, BTX aromatics,
(b) supplying the gaseous tops product from the prescrubber to an $H_2S$ scrubber for removal of $H_2S$,
(c) supplying the gaseous tops product from the $H_2S$ scrubber to a $CO_2$ scrubber for removal of $CO_2$,
(d) discharging a purified synthesis gas stream as a gaseous tops product from the $CO_2$ scrubber,
(e) supplying the liquid bottoms product from the prescrubber to an intermediate-pressure prescrubbing flash vessel, supplying the gaseous tops product from the intermediate-pressure prescrubbing flash vessel to a recompressor, supplying the liquid bottoms product from the intermediate-pressure prescrubbing flash vessel to a low-pressure prescrubbing flash vessel, supplying the gaseous tops product from the low-pressure prescrubbing flash vessel to the recompressor, supplying the liquid bottoms product from the low-pressure prescrubbing flash vessel to at least one apparatus for flash regeneration and/or hot regeneration of the scrubbing medium, (f) supplying the liquid bottoms product from the $H_2S$ scrubber to an intermediate-pressure $H_2S$ flash vessel, supplying the gaseous tops product from the intermediate-pressure $H_2S$ flash vessel to the recompressor, supplying the liquid bottoms product from the intermediate-pressure $H_2S$ flash vessel to a low-pressure $H_2S$ flash vessel, supplying the gaseous tops product from the low-pressure $H_2S$ flash vessel to the recompressor, supplying the liquid bottoms product from the low-pressure $H_2S$ flash vessel to at least one apparatus for flash regeneration and/or hot regeneration of the scrubbing medium, (g) supplying the liquid bottoms product from the $CO_2$ scrubber to an intermediate-pressure $CO_2$ flash vessel, supplying the gaseous tops product from the intermediate-pressure $CO_2$ flash vessel to the recompressor, supplying the liquid bottoms product from the intermediate-pressure $CO_2$ flash vessel to a low-pressure $CO_2$ flash vessel, supplying the gaseous tops product from the low-pressure $CO_2$ flash vessel to the low-pressure $H_2S$ flash vessel and/or to the recompressor, supplying the liquid bottoms product from the low-pressure $CO_2$ flash vessel to at least one apparatus for flash regeneration and/or hot regeneration of the scrubbing medium, (h) recycling the gas stream compressed by the recompressor to the prescrubber for the crude synthesis gas.

Plant According to the Invention

Plant for purifying a crude synthesis gas by gas scrubbing with a scrubbing medium comprising the following constituents and assemblies in fluid connection with one another:

(a) means for providing and supplying the crude synthesis gas to a prescrubber for removal of trace components such as $NH_3$, HCN, mercaptans, BTX aromatics, (b) means for supplying the gaseous tops product from the prescrubber to an $H_2S$ scrubber for removal of $H_2S$, (c) means for supplying the gaseous tops product from the $H_2S$ scrubber to a $CO_2$ scrubber for removal of $CO_2$, (d) means for discharging a purified synthesis gas stream as a gaseous tops product from the $CO_2$ scrubber, (e) means for supplying the liquid bottoms product to an intermediate-pressure prescrubbing flash vessel, means for supplying the gaseous tops product from the intermediate-pressure prescrubbing flash vessel to a recompressor, means for supplying the liquid bottoms product from the intermediate-pressure prescrubbing flash vessel to a low-pressure prescrubbing flash vessel, means for supplying the gaseous tops product from the low-pressure prescrubbing flash vessel to the recompressor, means for supplying the liquid bottoms product from the low-pressure prescrubbing flash vessel to at least one apparatus for flash regeneration and/or hot regeneration of the scrubbing medium, (f) means for supplying the liquid bottoms product from the $H_2S$ scrubber to an intermediate-pressure $H_2S$ flash vessel, means for supplying the gaseous tops product from the intermediate-pressure $H_2S$ flash vessel to the second stage or to a subsequent stage of the multi-stage recompressor, means for supplying the liquid bottoms product from the intermediate-pressure $H_2S$ flash vessel to a low-pressure $H_2S$ flash vessel, means for supplying the gaseous tops product from the low-pressure $H_2S$ flash vessel to the recompressor, means for supplying the liquid bottoms product from the low-pressure $H_2S$ flash vessel to at least one apparatus for flash regeneration and/or hot regeneration of the scrubbing medium, (g) means for supplying the liquid bottoms product from the $CO_2$ scrubber to an intermediate-pressure $CO_2$ flash vessel, means for supplying the gaseous tops product from the intermediate-pressure $CO_2$ flash vessel to the second stage or to a subsequent stage of the multi-stage recompressor, means for supplying the liquid bottoms product from the intermediate-pressure $CO_2$ flash vessel to a low-pressure $CO_2$ flash vessel, means for supplying the gaseous tops product from the low-pressure $CO_2$ flash vessel to the low-pressure $H_2S$ flash vessel and/or to the recompressor, means for supplying the liquid bottoms product from the low-pressure $CO_2$ flash vessel to at least one apparatus for flash regeneration and/or hot regeneration of the scrubbing medium, (h) means for recycling the gas stream compressed by the recompressor to the prescrubber for the crude synthesis gas.

The term scrubbing medium, synonymous with absorption medium or solvent, is in the context of the present invention to be understood as meaning substances or substance mixtures which under process conditions are in the form of a liquid, have an absorption capacity for the components to be separated from the gas and may be regenerated by physical methods, for example by flashing or by hot regeneration.

Flashing is to be understood as meaning a rapid, preferably abrupt, decompression of a liquid which is preferably effected upon entering a vessel via a flow limiter, for example a valve. The gases thus liberated are referred to as flash gases.

The term recompressor refers to a single-stage or multi-stage compressor having the task of increasing the pressure of a gas stream from a low value to a higher value, for example the entry pressure of the crude synthesis gas.

The supplying of a material stream to the expander also comprises the at least partial supplying thereof while the remainder of the material stream is for example passed to the recompressor.

The prescrubber, the $H_2S$ scrubber and the $CO_2$ scrubber need not necessarily be in the form of separate devices connected via conduits but in the context of the present invention may also be sections of one or more integrated absorption columns.

In the recycling of the gas stream compressed by the recompressor to the prescrubber for the crude synthesis gas the gas stream may be passed directly into the prescrubber via a separate conduit. The recycle conduit may alternatively open into the crude synthesis gas feed conduit to bring about a premixing of the recycled gas with the crude synthesis gas before entry into the scrubbing apparatus.

Fluid connection between two regions is to be understood as meaning any type of connection whatsoever which makes it possible that a fluid, for example the liquid scrubbing medium, can flow from the one to the other of the two regions, neglecting any interposed regions, component parts, valves or apparatuses.

Means for providing, supplying or discharging material streams to or from process stages or plant parts are to be understood as meaning all apparatuses, component parts and devices which a person skilled in the art would consider utilizing in the particular situation, in particular reservoir vessels, conduits, isolating and metering apparatuses such as for example valves, conveying apparatuses such as for example pumps, blowers, compressors.

Any pressure figures in the unit bar(a) are based on the absolute pressure in bar, absolute, unless stated otherwise in the individual case.

The invention is based on the finding that the obtained flash gases may also be utilized materially by recycling into the crude synthesis gas entering into the gas scrubbing process. The flash gases still contain proportions of the value components CO and $H_2$ and as a result of the inventive recycling to the crude synthesis gas can likewise pass at least partially into the synthesis gas partial product streams. This improves the overall balance of the process for these value components.

In a specific embodiment of the process according to the invention according to Claim 2 and of the plant according to the invention according to Claim 6, only a portion of the flash gases is utilized materially by recycling into the crude synthesis gas entering into the gas scrubbing process while another portion is passed to an expander, for example a multi-stage decompression turbine. This achieves an advantageous compromise between utilization of the flash gases materially and energetically.

PREFERRED EMBODIMENTS OF THE INVENTION

A preferred embodiment of the process according to the invention is characterized in that the scrubbing medium comprises one or more components selected from the group of: methanol, N-methylpyrrolidone (NMP), secondary amines, preferably diethanolamine, tertiary amines, preferably methyldiethanolamine, polyethylene glycol dialkyl ethers, preferably polyethylene glycol dimethyl ether. All of these absorption media are used for absorption of carbon dioxide and sulfur compounds, are chemically stable and chemically inert toward the substances to be separated and may be regenerated by decompression/hot regeneration.

It has proven particularly advantageous when the recompressor is a multi-stage recompressor, wherein the gaseous tops products from the low-pressure flash vessels are supplied to the first stage and the gaseous tops products from the intermediate-pressure flash vessels are supplied to a subsequent stage of the multi-stage recompressor. In this way the flash gases are compressed in energetically optimized fashion since they are supplied to the corresponding stage of the multi-stage recompressor having a similar pressure level.

BRIEF DESCRIPTION OF THE DRAWINGS

Further features, advantages and possible applications of the invention are also apparent from the description of working examples which follows and the drawings. All the features described and/or depicted, on their own or in any combination, form the subject-matter of the invention, irrespective of their combination in the claims or their dependency references.

DETAILED DESCRIPTION OF PREFERRED EMBODIMENTS

Figure 1:
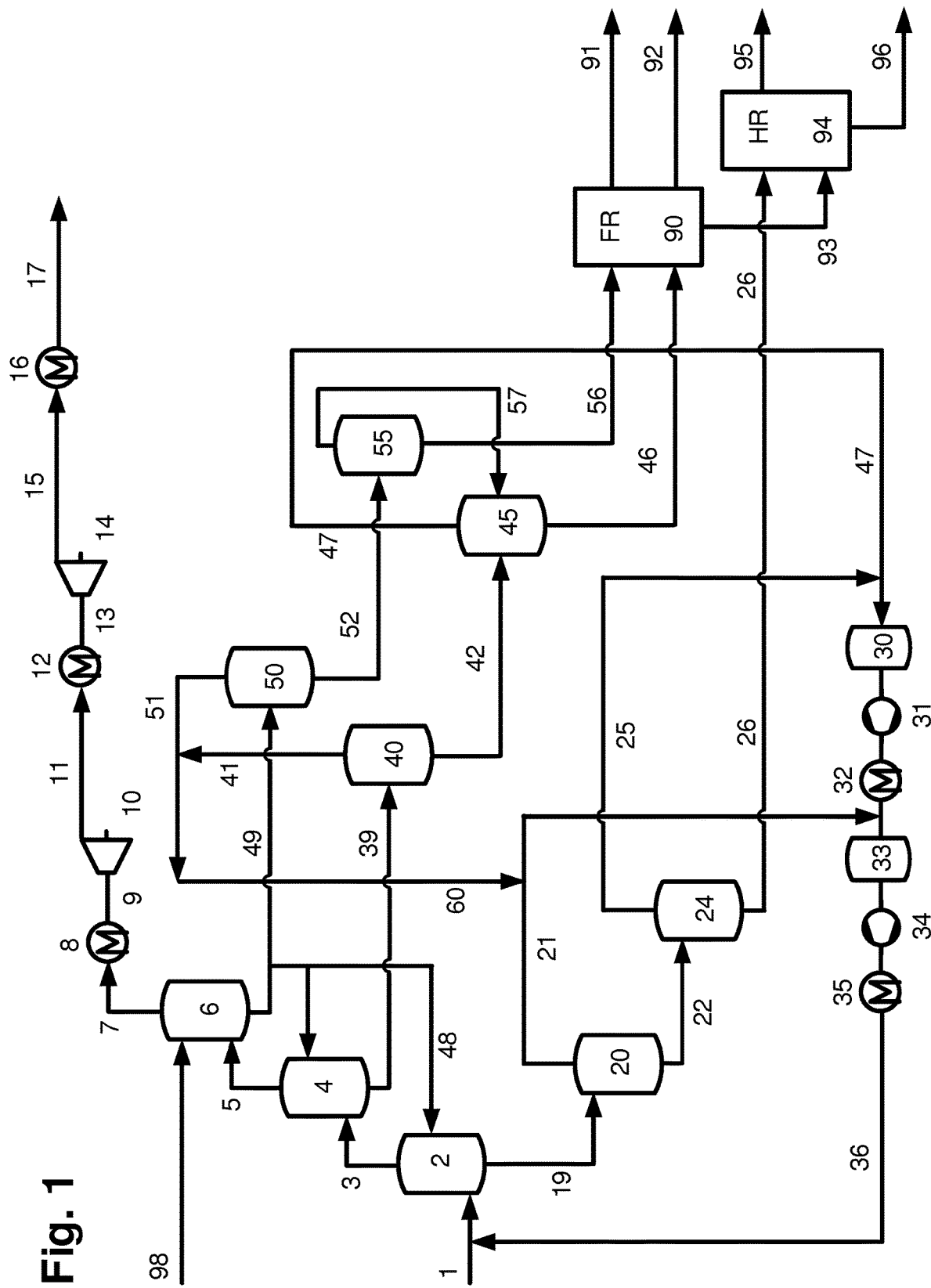
FIG. 1 shows a schematic diagram of the process according to the invention/of the plant according to the invention in a first embodiment.

In the schematic diagram shown in FIG. 1 of the process according to the invention/of the plant according to the invention according to a first embodiment crude synthesis gas is supplied via conduit 1 to a scrubbing apparatus comprising the scrubbers 2, 4 and 6. The individual scrubbers 2, 4, 6 may be separate devices or else regions of an integrated scrubbing/absorption column. The scrubbing medium employed in the present working example is cold methanol which is passed to the scrubbing apparatus via conduit 98. Usually a plurality of methanol streams of different degrees of purity/regeneration are supplied to the scrubbing apparatus at various points in a manner known to those skilled in the art (not shown).

Via conduit 1 the crude synthesis gas enters the prescrubber 2 for removal of trace components such as $NH_3$ and HCN with a typical pressure of 20 to 70 bar(a) and is therein scrubbed by means of methanol partially laden with acidic gas constituents which is supplied via conduit 48. Via conduit 3 the tops product from the prescrubber 2 is supplied to the $H_2S$ scrubber 4 and therein likewise scrubbed with partially laden methanol. The tops product from the $H_2S$ scrubber 4 is supplied via conduit 5 to the $CO_2$ scrubber 6 and therein scrubbed with methanol of high-purity which is supplied via conduit 98 and is formed by hot-regenerated methanol, fresh pure methanol or mixtures thereof. Via conduit 7 the tops product from the $CO_2$ scrubber 6 is supplied to an expander in the form of a two-stage decompression turbine comprising the coolers 8, 12, 16, the turbine stages 10, 14 and the internal conduits 9, 11, 13, 15. Therein the purified synthesis gas is decompressed to a pressure of typically 5 bar(a), thus recovering refrigeration and mechanical work. Condensate separators are typically present after each decompression stage but are not shown. Condensate collected here is recycled to a part of the plant in which liquids are processed at similar pressure; these are usually flash vessels. Via conduit 17 the decompressed pure synthesis gas is discharged from the process and sent for further treatment or processing.

The methanol scrubbing medium laden with trace components such as $NH_3$ and HCN in the prescrubber 2 is supplied via conduit 19 to the intermediate-pressure prescrubbing flash vessel 20 and therein decompressed to typically 15 to 40 bar(a). The thus-obtained gaseous tops product is passed via conduit 21 to the second stage of a recompressor which comprises the coolers 32, 35, the compressor stages 31, 34 and the separators 30, 33. The liquid bottoms product from the intermediate-pressure prescrubbing flash vessel 20 is passed via conduit 22 to a low-pressure prescrubbing flash vessel 24 and therein decompressed to typically 1.5 to 15 bar(a). The thus-obtained gaseous tops product is passed via conduit 25 to the first stage of the recompressor and therein introduced into the separator 30. The liquid bottoms product from the low-pressure prescrubbing flash vessel 24 is passed via conduit 26 to a hot regeneration apparatus 94.

The methanol scrubbing medium laden with hydrogen sulfide in the $H_2S$ scrubber 4 is supplied via conduit 39 to an intermediate-pressure $H_2S$ flash vessel 40 and therein decompressed to typically 15 to 40 bar(a). The thus-obtained gaseous tops product is passed via conduits 41, 51, 60 and 21 to the second stage of the recompressor. The liquid bottoms product from the intermediate-pressure $H_2S$ flash vessel 40 is passed via conduit 42 to a low-pressure $H_2S$ flash vessel 45 and therein decompressed to typically 1.5 to 15 bar(a). The thus-obtained gaseous tops product is passed via conduit 47 to the first stage of the recompressor and therein introduced into the separator 30. The liquid bottoms product from the low-pressure $H_2S$ flash vessel 45 is passed via conduit 46 to a flash regeneration apparatus 90.

The methanol scrubbing medium laden with carbon dioxide in the $CO_2$ scrubber 6 is supplied via conduit 49 to an intermediate-pressure $CO_2$ flash vessel 50 and therein decompressed to typically 15 to 40 bar(a). The thus-obtained gaseous tops product is passed via conduits 51, 60 and 21 to the second stage of the recompressor. The liquid bottoms product from the intermediate-pressure $CO_2$ flash vessel 50 is passed via conduit 52 to a low-pressure $CO_2$ flash vessel 55 and therein decompressed to typically 1.5 to 15 bar(a). The thus-obtained gaseous tops product is passed via conduit 57 to the low-pressure $H_2S$ flash vessel 45 and therein combined with the tops product therefrom. The liquid bottoms product from the low-pressure $CO_2$ flash vessel 55 is passed via conduit 56 to the flash regeneration apparatus 90.

The gas streams entering into the two-stage recompressor are in two pressure stages compressed to the pressure level of the crude synthesis gas and via conduits 36 and 1 recycled to the prescrubber 2. It is also possible for conduit 36 to pass directly into the prescrubber 2.

The laden methanol scrubbing medium introduced into the flash regeneration apparatus 90 is decompressed therein. The decompression is carried out in a plurality of stages (not shown) and finally a $CO_2$ product stream of high $CO_2$ purity and a $CO_2$ exhaust gas stream of lower $CO_2$ purity are obtained and discharged from the process via conduits 91 and 92. The procedure required here and the employed pressure stages are known per se to those skilled in the art. Also obtained is a methanol scrubbing medium laden essentially with hydrogen sulfide which is passed via conduit 93 to the hot regeneration apparatus 94. This too is a multi-stage apparatus (shown only schematically) and the individual process steps and process conditions of the hot regeneration are known to those skilled in the art. Obtained as the product of the hot regeneration is a methanol scrubbing medium stream of high purity (so-called fine scrubbing methanol) which—optionally after further treatment steps and with addition of fresh methanol—is recycled via conduit 98 to the $CO_2$ scrubber 6. Also obtained as a further product of the hot regeneration is an acidic gas stream which contains hydrogen sulfide and further sulfur components and via conduit 95 is discharged from the process and sent for further treatment or processing. The acidic gas stream is typically supplied to a sulfur recovery plant operating according to the Claus process for example (not shown).

Figure 2:
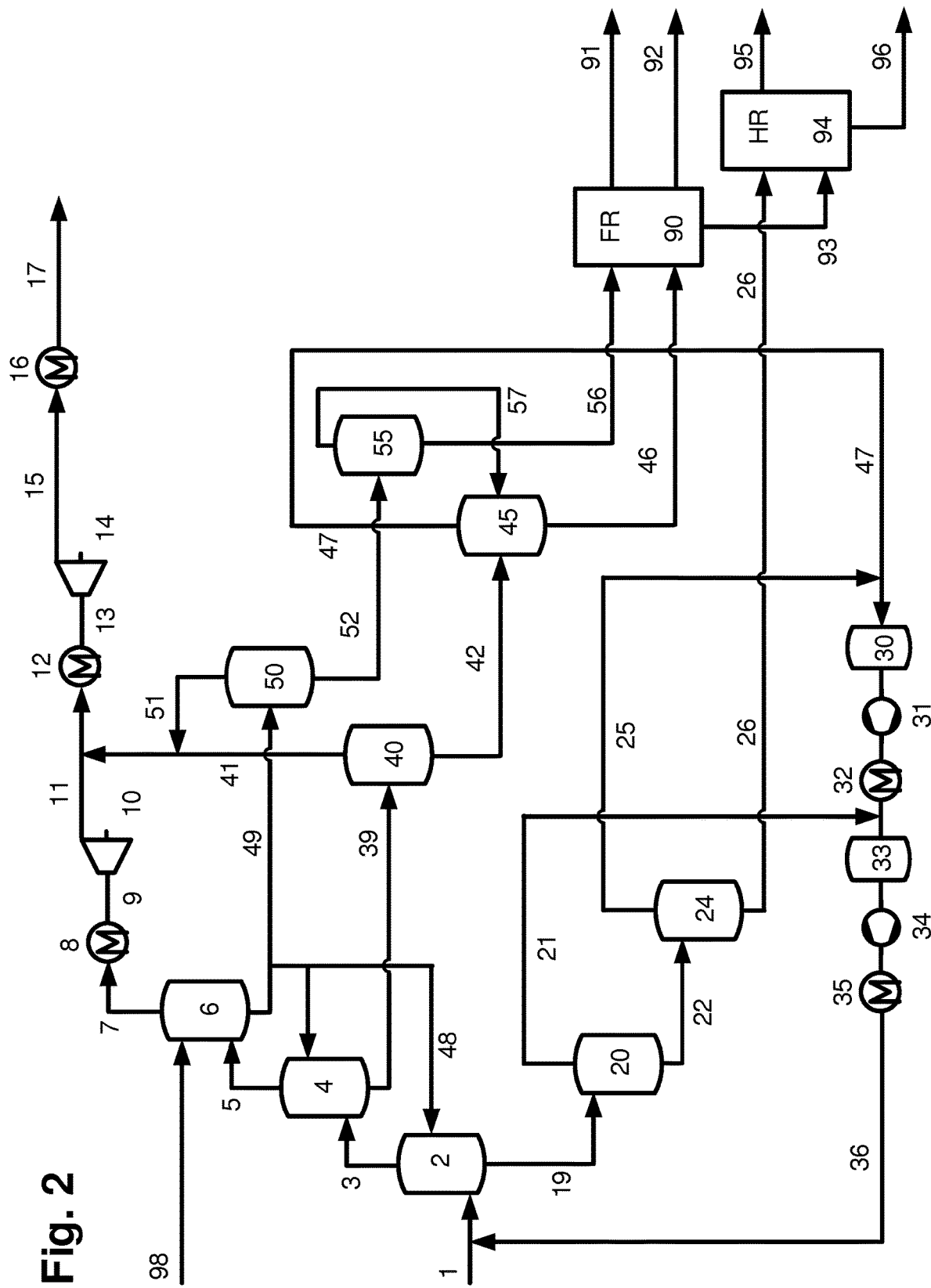
FIG. 2 shows a schematic diagram of the process according to the invention/of the plant according to the invention in a second embodiment.

The schematic representation of the process according to the invention/of the plant according to the invention in a second embodiment shown in FIG. 2 corresponds largely to the embodiment of FIG. 1. In contrast to the latter, the tops products from the intermediate-pressure $H_2S$ flash vessel 40 and from the intermediate-pressure $CO_2$ flash vessel 50 are passed via conduits 41 and 51 to the second stage of the two-stage expander. Accordingly, in this specific embodiment only a portion of the flash gases from the intermediate-pressure $H_2S$ flash vessel and the intermediate-pressure $CO_2$ flash vessel is utilized materially by recompressing and recycling to the crude synthesis gas entering into the gas scrubbing process while the remaining proportion of the flash gases is used for recovery of refrigeration and mechanical work and is thus utilized energetically. This achieves an advantageous compromise between utilization of the flash gases materially and energetically.

It is also possible to pass only a portion of the tops product from the intermediate-pressure $H_2S$ flash vessel 40 and the intermediate-pressure $CO_2$ flash vessel 50 to the second stage of the two-stage expander via conduits 41 and 51 while the remaining proportion is passed to the recompressor. This allows adjustability between material and energetic utilization of the flash gases.

INDUSTRIAL APPLICABILITY

The invention provides a gas scrubbing process and a corresponding plant for removal of acidic gas constituents from crude synthesis gas which make it possible to utilize the flash gases obtained during decompression of the laden scrubbing medium materially and/or energetically in advantageous fashion, namely for recovery of refrigeration and mechanical work.

LIST OF REFERENCE NUMERALS

1 Conduit
2 Prescrubber
3 Conduit
4 $H_2S$ scrubber
5 Conduit
6 $CO_2$ scrubber
7 Conduit
8 Cooler (heat exchanger)
9 Conduit
10 Turbine stage
11 Conduit
12 Cooler (heat exchanger)
13 Conduit
14 Turbine stage
15 Conduit
16 Cooler (heat exchanger)
17 Conduit
19 Conduit
20 Intermediate-pressure prescrubbing flash vessel
21 Conduit
22 Conduit
24 Low-pressure prescrubbing flash vessel
25 Conduit
26 Conduit
30 Separator
31 Compressor stage
32 Cooler (heat exchanger)
33 Separator
34 Compressor stage
35 Cooler (heat exchanger)
36 Conduit
39 Conduit
40 Intermediate-pressure $H_2S$ flash vessel
41 Conduit
42 Conduit
45 Low-pressure $H_2S$ flash vessel
46 Conduit
47 Conduit
49 Conduit
50 Intermediate-pressure $CO_2$ flash vessel
51 Conduit
52 Conduit
55 Low-pressure $CO_2$ flash vessel
56 Conduit
57 Conduit
60 Conduit
90 Flash regeneration apparatus 91 Conduit
92 Conduit
93 Conduit
94 Hot regeneration apparatus
95 Conduit
96 Conduit
98 Conduit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for purifying a crude synthesis gas by gas scrubbing with a scrubbing medium comprising:
   (a) providing and supplying the crude synthesis gas to a prescrubber for removal of trace components,
   (b) supplying a gaseous tops product from the prescrubber to an $H_2S$ scrubber for removal of $H_2S$,
   (c) supplying a gaseous tops product from the $H_2S$ scrubber to a $CO_2$ scrubber for removal of $CO_2$,
   (d) discharging a purified synthesis gas stream as a gaseous tops product from the $CO_2$ scrubber,
   (e) supplying a liquid bottoms product from the prescrubber to an intermediate-pressure prescrubbing flash vessel, supplying a gaseous tops product from the intermediate-pressure prescrubbing flash vessel to a recompressor, supplying a liquid bottoms product from the intermediate-pressure prescrubbing flash vessel to a low-pressure prescrubbing flash vessel, supplying a gaseous tops product from the low-pressure prescrubbing flash vessel to the recompressor, supplying a liquid bottoms product from the low-pressure prescrubbing flash vessel to at least one apparatus for flash regeneration and/or hot regeneration of the scrubbing medium,
   (f) supplying a liquid bottoms product from the $H_2S$ scrubber to an intermediate-pressure $H_2S$ flash vessel, supplying a gaseous tops product from the intermediate-pressure $H_2S$ flash vessel to the recompressor, supplying a liquid bottoms product from the intermediate-pressure $H_2S$ flash vessel to a low-pressure $H_2S$ flash vessel, supplying a gaseous tops product from the low-pressure $H_2S$ flash vessel to the recompressor, supplying a liquid bottoms product from the low-pressure $H_2S$ flash vessel to at least one apparatus for flash regeneration and/or hot regeneration of the scrubbing medium,
   (g) supplying a liquid bottoms product from the $CO_2$ scrubber to an intermediate-pressure $CO_2$ flash vessel, supplying a gaseous tops product from the intermediate-pressure $CO_2$ flash vessel to the recompressor, supplying a liquid bottoms product from the intermediate-pressure $CO_2$ flash vessel to a low-pressure $CO_2$ flash vessel, supplying a gaseous tops product from the low-pressure $CO_2$ flash vessel to the low-pressure $H_2S$ flash vessel and/or to the recompressor, supplying a liquid bottoms product from the low-pressure $CO_2$ flash vessel to at least one apparatus for flash regeneration and/or hot regeneration of the scrubbing medium,
   (h) recycling the gas stream compressed by the recompressor to the prescrubber for the crude synthesis gas.

2. The process according to claim 1, wherein the scrubbing medium comprises one or more components selected from the group consisting of: methanol, N-methylpyrrolidone (NMP), secondary amines, diethanolamine, tertiary amines, methyldiethanolamine, polyethylene glycol dialkyl ethers, and polyethylene glycol dimethyl ether.

3. Process according to claim 1, wherein the recompressor is a multi-stage recompressor, wherein the gaseous tops products from the low-pressure flash vessels are supplied to the first stage and the gaseous tops products from the intermediate-pressure flash vessels are supplied to a subsequent stage of the multi-stage recompressor.

4. A process for purifying a crude synthesis gas by gas scrubbing with a scrubbing medium comprising:
   (a) providing and supplying the crude synthesis gas to a prescrubber,
   (b) supplying a gaseous tops product from the prescrubber to an $H_2S$ scrubber,
   (c) supplying a gaseous tops product from the $H_2S$ scrubber to a $CO_2$ scrubber,
   (d) introducing at least a portion of a gaseous tops product from the $CO_2$ scrubber into a multi-stage expander to recover mechanical work and refrigeration and to discharge an expanded, purified synthesis gas stream from the multi-stage expander,
   (e) supplying a liquid bottoms product from the prescrubber to an intermediate-pressure prescrubbing flash vessel, supplying a gaseous tops product from the intermediate-pressure prescrubbing flash vessel to a recompressor, supplying a liquid bottoms product from the intermediate-pressure prescrubbing flash vessel to a low-pressure prescrubbing flash vessel, supplying a gaseous tops product from the low-pressure prescrubbing flash vessel to the recompressor, supplying a liquid bottoms product from the low-pressure prescrubbing flash vessel to at least one apparatus for flash regeneration and/or hot regeneration of the scrubbing medium,
   (f) supplying a liquid bottoms product from the $H_2S$ scrubber to an intermediate-pressure $H_2S$ flash vessel, supplying a gaseous tops product from the intermediate-pressure $H_2S$ flash vessel to the first stage or a subsequent stage of the multi-stage expander or into the conduit downstream of the expander, supplying a liquid bottoms product from the intermediate-pressure $H_2S$ flash vessel to a low-pressure $H_2S$ flash vessel, supplying a gaseous tops product from the low-pressure $H_2S$ flash vessel to the recompressor, supplying a liquid bottoms product from the low-pressure $H_2S$ flash vessel to at least one apparatus for flash regeneration and/or hot regeneration of the scrubbing medium,
   (g) supplying a liquid bottoms product from the $CO_2$ scrubber to an intermediate-pressure $CO_2$ flash vessel, supplying a gaseous tops product from the intermediate-pressure $CO_2$ flash vessel to the first stage or a subsequent stage of the multi-stage expander or into the conduit downstream of the expander, supplying a liquid bottoms product from the intermediate-pressure $CO_2$ flash vessel to a low-pressure $CO_2$ flash vessel, supplying a gaseous tops product from the low-pressure $CO_2$ flash vessel to the low-pressure $H_2S$ flash vessel and/or to the recompressor, supplying a liquid bottoms product from the low-pressure $CO_2$ flash vessel to at least one apparatus for flash regeneration and/or hot regeneration of the scrubbing medium,
   (h) recycling the gas stream compressed by the recompressor to the prescrubber for the crude synthesis gas.

5. The process according to claim 4, wherein the scrubbing medium comprises one or more components selected from the group consisting of: methanol, N-methylpyrrolidone (NMP), secondary amines, diethanolamine, tertiary amines, methyldiethanolamine, polyethylene glycol dialkyl ethers, and polyethylene glycol dimethyl ether.

6. Process according to claim 4, wherein the recompressor is a multi-stage recompressor, wherein the gaseous tops products from the low-pressure flash vessels are supplied to the first stage and the gaseous tops products from the intermediate-pressure flash vessels are supplied to a subsequent stage of the multi-stage recompressor.

* * * * *